United States Patent
Zhao

(10) Patent No.: US 8,246,515 B2
(45) Date of Patent: Aug. 21, 2012

(54) METHOD FOR MANUALLY SHIFTING AN AUTOMATIC TRANSMISSION THROUGH THE ACCELERATOR PEDAL

(76) Inventor: Ruimin Zhao, Marietta, GA (US)

( * ) Notice: Subject to any disclaimer, the term of this patent is extended or adjusted under 35 U.S.C. 154(b) by 799 days.

(21) Appl. No.: 12/395,391

(22) Filed: Feb. 27, 2009

(65) Prior Publication Data

US 2010/0222177 A1  Sep. 2, 2010

(51) Int. Cl.
*B60W 10/06* (2006.01)
*B60W 10/10* (2012.01)

(52) U.S. Cl. ........................ 477/115; 477/905

(58) Field of Classification Search ............... 477/905
See application file for complete search history.

(56) References Cited

U.S. PATENT DOCUMENTS

| | | | |
|---|---|---|---|
| 5,123,301 A | 6/1992 | Hagele | |
| 5,335,743 A | 8/1994 | Gillbrand et al. | |
| 5,365,803 A | 11/1994 | Kelley et al. | |
| 5,769,754 A * | 6/1998 | Kil | 477/133 |
| 5,865,705 A | 2/1999 | Shamoto et al. | |
| 6,053,066 A | 4/2000 | Ishii et al. | |
| 6,213,916 B1 | 4/2001 | Ning | |
| 6,223,112 B1 | 4/2001 | Nishino | |
| 6,474,187 B1 | 11/2002 | Vollmar | |
| 6,527,672 B1 * | 3/2003 | Henneken et al. | 477/125 |
| 6,945,132 B2 | 9/2005 | Kim | |
| 7,131,347 B2 | 11/2006 | Yoshikawa et al. | |

FOREIGN PATENT DOCUMENTS

JP  61248947  11/1986

* cited by examiner

*Primary Examiner* — Edwin A Young
(74) *Attorney, Agent, or Firm* — Charlena Thorpe, Esq.; The Law Office of Charlena Thorpe, Inc.

(57) ABSTRACT

A method for generating manual shift request for controlling the automatic transmission of an automotive vehicle comprises:

generating an up shift request (24) when the movement of the accelerator pedal of the vehicle matches a predefined pattern for requesting an up shift (22), and generating a down shift request (28) when the movement of the accelerator pedal of the vehicle matches a predefined pattern for requesting a down shift (26).

11 Claims, 2 Drawing Sheets

METHOD FOR MANUALLY SHIFTING AN AUTOMATIC TRANSMISSION THROUGH THE ACCELERATOR PEDAL

CROSS-REFERENCE TO RELATED APPLICATIONS

Not applicable.

BACKGROUND

1. Field of Invention

This invention relates generally to a mechanism for shifting the automatic transmission of an automotive vehicle, and more specifically, to a method that allows the operator to manually shift the automatic transmission.

2. Description of Prior Art

The two main components of the powertrain of an automotive vehicle are the engine and the transmission. The transmission converts engine speed and torque in accordance with the traction demand of the vehicle. Transmissions are generally either manually or automatically actuated. Manual transmissions generally include mechanical mechanisms for coupling rotating gears to produce different ratio outputs to drive the wheels. Automatic transmissions are designed to take automatic control of the frictional units, gear ratio selection and gear shifting.

The operation of an automatic transmission is typically transparent to the operator, requiring little attention from the operator. However, some operators may like more control of the vehicle in certain situations. To these operators, manual shifting of the automatic transmission is a welcome option.

Various methods have been invented to allow the operator to manually generate commands or requests for controlling the shifting of an automatic transmission. U.S. patent Ser. No. JP61/248,947 to Hideji discloses a range selector that makes available all the individual Forward gears, the Reverse gear, the Neutral position, the Park position, and the Drive position. The transmission is automatic only when the selector is in Drive, in which position the transmission automatically shifts through the Forward drive gears. With this type of system, the operator has the option to command any of the Forward drive gears, regardless of the vehicle speed. This kind of direct control causes a safety concern because it may make the engine rotate too fast or too slow.

Because of the safety concern, methods that generate sequential shift requests are more useful. With these methods, each time the operator wants to intervene in the shifting of the automatic transmission, he or she can generate an upshift or downshift request to the transmission control system. The transmission will then shift by one gear in the requested direction if the control logic allows such a shift. If the transmission is currently in gear 2 and the operator wants to manually shift the transmission to gear 4, he or she has to generate two upshift requests in order to achieve a transmission shift in a sequence from gear 2 to gear 3 and then from gear 3 to gear 4.

A number of methods have been invented for the operator to generate sequential shift requests. All of them achieve the purpose by using electric switches. The switches are incorporated into the gear range selector (For example, U.S. Pat. No. 6,053,066 to Ishii, et al., U.S. Pat. No. 6,223,112 to Nishino), the steering wheel (For example, U.S. Pat. No. 5,335,743 Gillbrand, et al., U.S. Pat. No. 5,365,803 to Kelley, et al., U.S. Pat. No. 6,053,066 to Ishii, et al., U.S. Pat. No. 6,223,112 to Nishino, U.S. Pat. No. 6,474,187 to Vollmar, U.S. Pat. No. 7,131,347 to Yoshikawa, et al.), or the steering column (For example, U.S. Pat. No. 5,865,705 to Shamoto, et al., U.S. Pat. No. 6,945,132 to Kim). These switched are operated in the form of a handle, push buttons, or a lever.

All of the existing methods for manually shifting an automatic transmission place a burden on the operator: the operator is required to use a hand to locate and manipulate an operating device (a handle, a push button, or a lever) every time he or she generates a shift request. In addition, the input device, whether it is a redesigned gear range selector, a set of push buttons on the steering wheel, or a level assembly on the steering column, may incur substantial manufacturing cost.

The rate of the movement of the accelerator pedal has been used for controlling automatic transmission. U.S. Pat. No. 5,123,301 to Hagele disclosed a method that uses that kind of information to switch between two modes of transmission operation. U.S. Pat. No. 6,213,916 to Ning prescribes a method that uses the pedal movement rate information to control the clutch engagement rate. However, no prior art has taught how to use the accelerator pedal to manually shift an automatic transmission.

SUMMARY

According to the present invention, the objective of conveniently and quickly generating manual shift requests for shifting a vehicle's automatic transmission is achieved by generating an up shift or down shift request when the movement of the accelerator pedal of the vehicle matches a predefined pattern for requesting that type of shift.

In the preferred embodiment, the predefined pattern for requesting an up shift requires the accelerator to have a fast upward movement, a quick slowing-down from the fast upward movement, and a downward movement immediately afterwards; the predefined pattern for requesting a down shift requires a quick speeding-up to a fast downward movement of the accelerator pedal.

Objects and Advantages

The following are the objects and advantages of the present invention:

(a) to provide a foot-operated method for manually shifting an automatic transmission;

(b) to provide a method for generating manual shift requests that does not require the operator to locate separately the device to be operated when a shift is desired;

(c) to provide a method for generating manual shift requests that is quicker, more intuitive, and more fun to use than the existing, hand-operated methods; and (d) to provide a method for generating manual shift requests that is less costly to implement than the existing, hand-operated methods.

DRAWING FIGURES

Figure 1:
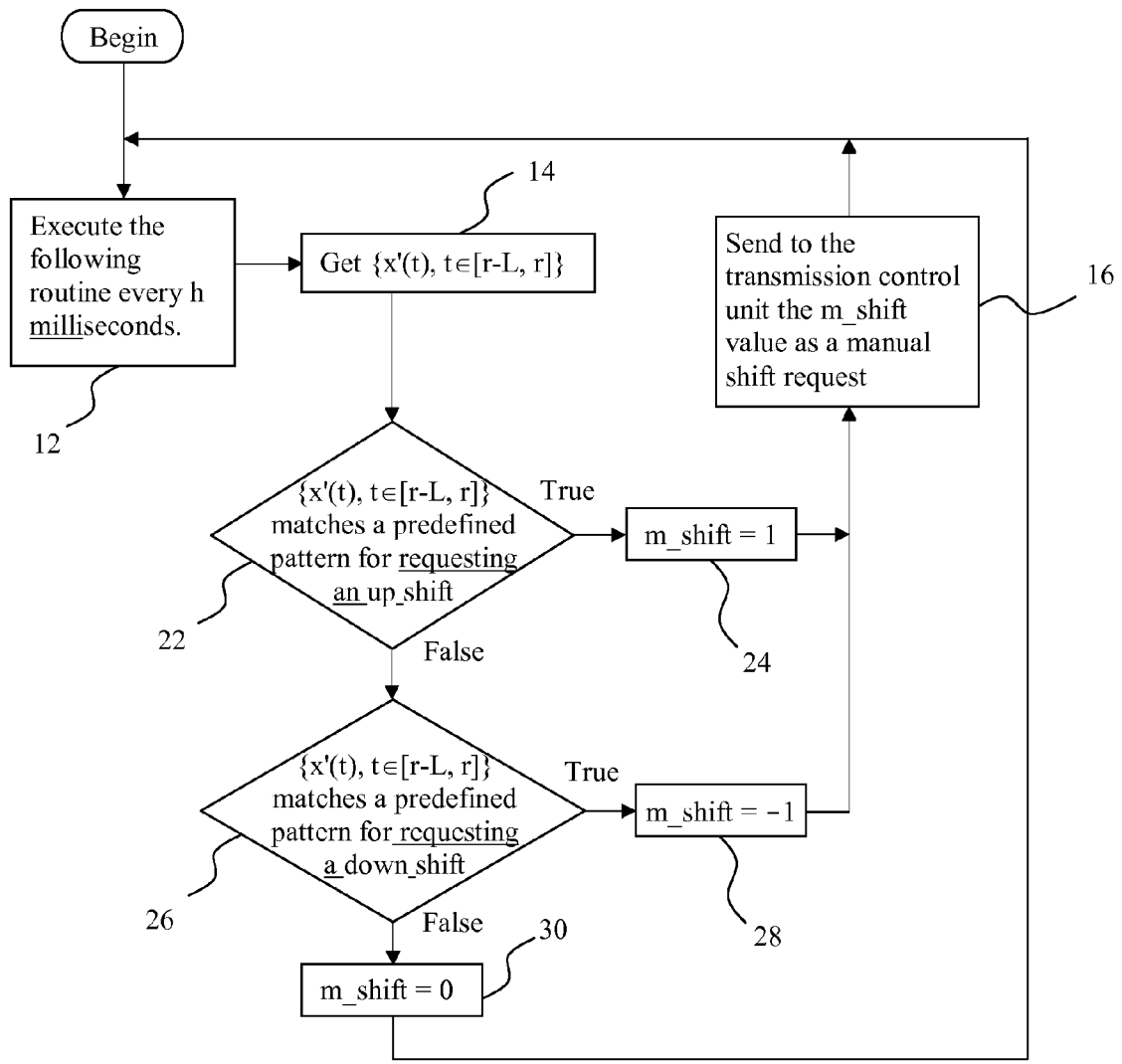
FIG. 1 is a high level block diagram of the preferred embodiment.

REFERENCE NUMBERS IN DRAWINGS 12 timer
14 input step
16 output step
22 testing step for recognizing the pattern for requesting an up shift
24 step to indicate an up shift request 26 testing step for recognizing the pattern for requesting a down shift
28 step to indicate a down shift request
30 step to indicate no shift request
50 initialization step for controlling minimum interval between manual shift requests
52 timer
54 data input and calculation of the first- and second-order time derivatives of the position of the accelerator pedal
56 step to send the generated shift request to the transmission control module
58 testing step for controlling minimum interval between manual shift requests
60 memory-updating step for controlling minimum interval between manual shift requests
62 testing step for recognizing the pattern for requesting an up shift
64 step to indicate an up shift request
66 testing step for recognizing the pattern for requesting a down shift
68 step to indicate an up shift request
70 step to indicate no shift request

DESCRIPTIONS—FIGS 1, 2—PREFERRED EMBODIMENT

FIG. 1 shows the high-level block diagram of the method to generate manual shift requests via the accelerator pedal. The first block 12 is a timer. It triggers the execution of the core part of the method consisting of blocks 14 through 30 every h milliseconds.

Once triggered by the timer 12, block 14 obtains the wave of the accelerator pedal's angular movement rate, or the first-order time derivative of the pedal's angular position, for the last L milliseconds. Note that the variable r is the current time value in milliseconds. Block 22 tests if the wave for the last L milliseconds matches the predefined pattern for upshift. If the test result is True, then block 24 is executed, setting the variable m_shift to 1 to indicate an upshift request. If the test result from block 22 is False, a further test 26 is performed to check if the wave for the last L milliseconds matches the predefined pattern for downshift. If the result is True, then block 28 is executed, setting the variable m_shift to −1 to indicate a downshift request. Otherwise, block 30 is executed, setting the variable m_shift to 0 to indicate that no shift is requested. The control is then handed back to the timer 12.

The execution of block 24 or block 28 means that an upshift or downshift request has been indicated. The next step is block 16, which sends the generated manual shift request, indicated by the value of the variable m_shift, to the transmission control unit of the vehicle, which may or may not act according to the request depending on its own control logic.

Figure 2:
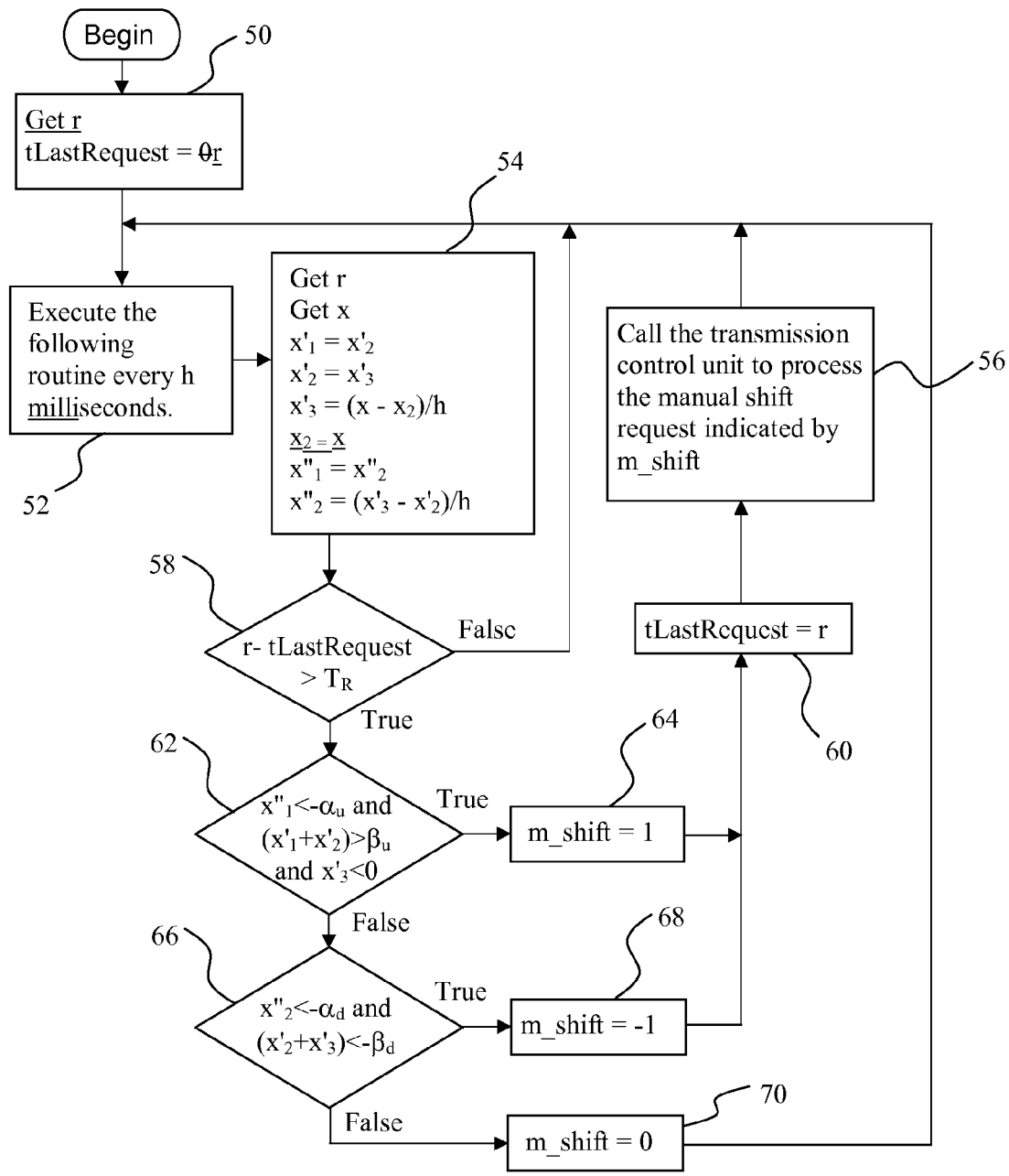
FIG. 2 is the implementation level algorithm of the preferred embodiment.

FIG. 2 is an implementation level algorithm for generating manual shift requests via the accelerator pedal. Blocks 52, 56, 64, 68, and 70 correspond to blocks 12, 16, 24, 28, and 30, respectively, in FIG. 1 and they show the same level of detail. Blocks 54, 62, and 66 correspond to blocks 14, 22, and 26 in FIG. 1 and they show implementation level details. Block 54 obtains the current time value in milliseconds, r, and the accelerator pedal's current angular position value in percent, x, and produces average first-order time derivative x' values ($x'_1$, $x'_2$, and $x'_3$) for three time intervals ([r−3*h, r−2*h], [r−2*h, r−h], and [r−h, r]) and average second-order time derivative x" values ($x"_1$ and $x"_2$) for two time intervals ([r−3*h, r−h] and [r−2*h, r]). Block 62 uses all three average x' values, one x" value ($x"_1$), and two parameters ($\alpha_u$ and $\beta_u$) to recognize the pattern for requesting an up shift. In essence, it detects a quick ending of a fast upward movement of the accelerator pedal. Block 66 uses two average x' values ($x'_2$ and $x'_3$), one x" value ($x"_2$), and two parameters ($\alpha_d$ and $\beta_d$) to recognize the pattern for requesting a down shift by detecting quick beginning of a fast downward movement of the accelerator pedal. Blocks 50, 58, and 60 ensure that consecutive shift requests are at least $T_R$ milliseconds apart.

ADVANTAGES

The following are the advantages of the present invention over the pre-existing methods of manually shifting an automatic transmission in a automotive vehicle:

(a) the operator can manually shift the automatic transmission by using the foot that is already on the accelerator pedal;

(b) the operator does not need to use a hand to find and operate an additional device;

(c) this method is quicker to use because of (a) and (b);

(d) this method is more intuitive to use because the quick movements of the accelerator pedal required for generating down or up shift requests are in the same directions of the pedal movements when the operator needs more or less power from the engine;

(e) this method can make driving more fun because it allows the operator to control the shifting of the automatic transmission with simple and intuitive foot movements;

(f) this method is less costly to implement because it does not require any additional hardware device; and (g) this method can be implemented in some vehicles that are already in service by modifying the transmission control software.

CONCLUSION, RAMIFICATIONS, AND SCOPE

The present invention describes a foot-operated method for manually shifting the automatic transmission in an automotive vehicle. Compared to the existing, hand-operated methods, this method is simpler, quicker, and more intuitive to use. It will give drivers more control of the shifting of automatic transmissions and can make driving more fun. In addition, this method can be easily implemented because it does not require a dedicated hardware device. It can even be implemented in some modern vehicles that are already in service by modifying the transmission control software.

Although FIG. 2 in this application shows an implementation level algorithm, it should not be construed as limiting the scope of the invention. There can be other implementation level algorithms using the same idea of generating manual shift requests by using the movement patterns of the accelerator pedal.

Thus the scope of the invention should be determined by the appended claims and their legal equivalents, rather than by the example given.

I claim:

1. A method for generating manual shift requests for controlling an automatic transmission of an automotive vehicle, comprising:

(a) generating manual up shift request when the movement of an accelerator pedal of the automotive vehicle matches a predefined pattern for up-shifting, and (b) generating a manual down shift request when the movement of the accelerator pedal of the automotive vehicle matches a predefined pattern for down shifting.

2. The method of claim 1 wherein the predefined pattern for up-shifting comprises:

(a) an upward movement of the accelerator pedal, (b) followed by a downward movement of the accelerator pedal.

3. The method of claim 1 wherein the predefined pattern for down-shifting comprises:
   (a) a downward movement of the accelerator pedal.

4. The method of claim 1 further comprising determining whether the movement of the accelerator pedal matches a predefined pattern for up-shifting by calculating a plurality of first-order time derivatives of the position of the accelerator pedal during a monitored time window.

5. The method of claim 1 wherein the predefined pattern for up-shifting comprises an upward movement of the accelerator pedal.

6. The method of claim 1 further comprising determining whether the movement of the accelerator pedal matches a predefined pattern for down shifting by calculating a plurality of first-order time derivatives of the position of the accelerator pedal during a monitored time window.

7. An automotive vehicle comprising:
   an automatic transmission;
   a transmission control unit for controlling the automatic transmission;
   an accelerator pedal connected to the transmission control unit; and
   code to determine whether the movement of the accelerator pedal matches a predefined pattern for up-shifting or down shifting and generate an up-shift or down-shift request to the transmission control unit to control the automatic transmission when the predefined pattern is determined.

8. The automotive vehicle of claim 5 wherein the code to determine whether the movement of the accelerator pedal matches a predefined pattern for up-shifting by calculating a plurality of first-order time derivatives of the position of the accelerator pedal during a monitored time window.

9. The automotive vehicle of claim 8 wherein the predefined pattern for up-shifting comprises an upward movement of the accelerator pedal followed by a downward movement of the accelerator pedal.

10. The automotive vehicle of claim 7 wherein the code to determine whether the movement of the accelerator pedal matches a predefined pattern for down-shifting by calculating a plurality of first-order time derivatives of the position of the accelerator pedal during a monitored time window.

11. The automotive vehicle of claim 10 wherein the predefined pattern for down-shifting comprises a downward movement of the accelerator pedal.

* * * * *